United States Patent [19]

Sollich

[11] Patent Number: 5,032,418
[45] Date of Patent: Jul. 16, 1991

[54] METHOD FOR CONTINUOUSLY PREPARING MASSES CONTAINING COCOA BUTTER OR SIMILAR FATS

[75] Inventor: Helmut Sollich, Rabenkirchen, Fed. Rep. of Germany

[73] Assignee: Sollich GmbH & Co. KG, Bad Salzuflen, Fed. Rep. of Germany

[21] Appl. No.: 514,153

[22] Filed: Apr. 25, 1990

[30] Foreign Application Priority Data

Apr. 27, 1989 [DE] Fed. Rep. of Germany ....... 3913941

[51] Int. Cl.$^5$ .............................................. A23G 1/00
[52] U.S. Cl. .................................. 426/520; 426/524; 426/660
[58] Field of Search ................ 426/519, 520, 524, 660

[56] References Cited

U.S. PATENT DOCUMENTS 4,859,483 8/1989 Sollich ................................. 426/660

Primary Examiner—George Yeung
Attorney, Agent, or Firm—Max Fogiel

[57] ABSTRACT

A method of continuously preparing masses, especially masses of chocolate, that contain cocoa butter or other fats, for processing, in a tempering machine with a cooling section that has several cooling stages and a reheating section that has several reheating stages, which the mass travels through while being cooled in the cooling section and reheated in the reheating section. When less mass is being put through, one or more cooling stages (9 and 9') at the end are withdrawn from the cooling section (6) and added to the reheating section (7).

5 Claims, 3 Drawing Sheets

METHOD FOR CONTINUOUSLY PREPARING MASSES CONTAINING COCOA BUTTER OR SIMILAR FATS

BACKGROUND OF THE INVENTION

The present invention concerns a method of continuously preparing masses, especially masses of chocolate, that contain cocoa butter or other fats, for processing, in a tempering machine with a cooling section that has several cooling stages and a reheating section that has several reheating stages, which the mass travels through while being cooled in the cooling section and reheated in the reheating section. The device for carrying out the method involves a tempering machine with a series of several cooling stages, each of which has compartments for processing the mass and contain mixers and stirrers and which together constitute the cooling section, wherein the mass is cooled by heat exchange with heat-exchange surfaces in conjunction with a coolant that is connected to a circulation system, subsequent to which the mass is advanced to a reheating section that consists of a series of several reheating stages, each of which has compartments for processing the mass and contain mixers and stirrers and which together constitute the reheating section, wherein the mass is reheated by heat exchange with heat-exchange surfaces in conjunction with a tempering fluid that is connected to a circulation system.

A method and a device of this type are known from European Exposure 289 849. The amount of coolant flowing through the cooling stages is kept high enough to generate turbulent flow. The mass is blended thoroughly enough in the compartments by mixers and stirrers contained in them to generate turbulence accompanied by a relatively high shear rate in the interval between the heat-exchange surfaces and the stirrers. The amount of coolant recirculated through the cooling compartment is constant. The coolant is continuously recirculated. The temperature of the coolant is maintained within a comparatively narrow range. The temperatures employed at the coolant end are relatively high in absolute terms due to the improved heat transfer. They range from 16° to 22° C. The mass is accordingly cooled to an ultimate approximately 28° to 29° at the end of the cooling section and beginning of the reheating section. The result is the highest possible number of stable crystals in the $\beta$ form. In the next reheating section, a tempering medium travels through a tempering circulation system, wherein its quantity and temperature are maintained constant and a temperature within the range of 31.5° to 33° C. is employed for a very wide range of applications. The mass leaves the reheating section at a temperature of approximately 31.5° to 32.5°. Since this mass-exit temperature is approximately 2° higher than previously known, the properties needed for further processing are improved. The ratio of the area of the heat-exchange surfaces in the cooling section to those in the reheating section can be approximately on the order of 1:1, meaning that the cooling section and reheating section can be more or less the same size. The number of cooling stages in the cooling stage and or reheating stages in the reheating section depends on the desired rating that the tempering machine is designed for. When a tempering machine of this type is operated, say, at its rated output or even at approximately 80 to 110% of its rated output, the properties will be outstanding and the mass will be well tempered accompanied by such overall advantages as good contraction, luster, crispness, etc., associated with a comparatively high percentage of stable crystals in the $\beta$ form. When on the other hand such a tempering machine is operated for example at only 40 to 75% of its rated output, the tempering will be less satisfactory. This can be ascribed to the necessity for the temperature of the coolant in the cooling section to be more than approximately 22° to prevent the smaller throughput of mass from being excessively cooled at the end of the cooling section. This is valid for methods wherein the coolant is continuously recirculated in the cooling section. In tempering machines wherein the coolant is discontinuously recirculated as the system is turned on and off, the "out" times will lengthen in relation to when the coolant is flowing through the cooling section. The result is discontinuities in temperature and in temperature degrees that lead to different degrees of germination because the temperature of the coolant also climbs to over 22° during out times. The mass can also not be well tempered to this extent.

Also known are tempering machines wherein the cooling section is more extensive and even substantially more extensive than the reheating section, with the heat-exchange surfaces in the cooling section having approximately twice as much area as those in the reheating section. It is known in conjunction with such tempering machines to divide the cooling section and shut down some of the divisions where the mass enters the cooling section when the machine is operated at low output. This is accomplished by adding the first cooling stage of the cooling section to the circulating heating system that protects the intake into the tempering machine. It is accordingly only the subsequent stages in the cooling section that do the cooling, and the heat-exchange surface in the cooling section is less extensive, so that the coolant can otherwise be controlled as usual. The result is that the germination will be just as satisfactory at reduced output as it is at full-scale operation.

German Patent 2 536 063 discloses a continuous-operation tempering machine with a number of separate cooling stages followed by a homogenization compartment with a different shape that can be heated by a tempering circulation system such that the mass can be powerfully blended without increasing its temperature very much. Differences in the temperature of the mass are eliminated and the crystals are uniformly distributed throughout the mass. The low melting-point crystals also have time and opportunity to melt and change to higher melting-point crystal types.

SUMMARY OF THE INVENTION

The object of the invention is to improve a method and device of the aforesaid type to the extent that the tempering will be satisfactory and the germination level high even when the mass throughput is lower than the rated capacity.

This object is attained in accordance with the invention in that, when less mass is being put through, one or more cooling stages at the end are withdrawn from the cooling section and added to the reheating section. Thus, one or more cooling stages are withdrawn from the cooling circulation system and added to the tempering circulation system. These cooling stages are not at the beginning of the cooling section but at its end, at the transition to the reheating section, that is. The converted cooling stages are accordingly not removed from operation but reinforce the reheating stages when the mass throughput is reduced. The total area of heat-exchange surfaces and the residence time are accordingly decreased in the cooling section and increased in the reheating section. It becomes possible to advantage to maintain the temperature of the coolant in the cooling section between 16° and 22° so that it cannot exceed the threshold. It accordingly also becomes possible for the mass to have a temperature of approximately 28° to 29° C. at the end of the cooling section and as it enters the reheating section, promoting the formation of stable crystal modifications. The temperature of the tempering fluid must accordingly be set only slightly lower than it would be if a mass were being put through at full rated operation. The drop in temperature is generally on the order of fractions of a degree to approximately 1° C. Surprisingly the tempering is better and the level of germination higher in this method when less mass is put through than at rated capacity. This feature can be exploited in many ways. In many applications it is necessary to operate a tempering machine that is designed for rated capacity at a lower mass throughput only temporarily, either because the operation is only a start-up process in terms of production or because alternating products necessitate it. It is on the other hand also possible to continuously temper masses that are especially difficult to temper in a sort of permanent operation at an accordingly reduced mass throughput in terms of the tempering machine's rating. A situation of this type can also occur when further processing of the product is particularly difficult, when for example a coating procedure or other product-forming operation must be followed by very rapid cooling. It is also possible, especially for particular applications, to purposely build tempering machines that are too large in terms of area in relation to the rated capacity for a particular situation and operate them at less than full capacity in order to attain outstanding tempering.

The method in accordance with the invention can be employed independently of the area-to-area or volume-to-volume ratios of the mass-processing compartments between the cooling section and the reheating section. It is even especially effective for the ratio of the area of the heat-exchange surfaces in the cooling section to that in the reheating section to be less than 1, for the cooling section to be larger than the reheating section, that is, when operating at rated capacity.

Enough cooling stages can be withdrawn from the cooling section and added to the reheating section to ensure that the ratio of the area of heat-exchange surfaces in the cooling section to that of the heat-exchange surfaces in the reheating section will be between 3:2 and 1:4. The area of the heat-exchange surfaces in the reheating section will be definitely relatively large in relation to that of the overall heat-exchange surface at such a ration. It accordingly becomes possible to exploit the particular advantage of allowing high mass-exit temperatures, which is generally of advantage in processing a mass. The higher temperature at the end of the cooling section comparatively increases the percentage of stable crystals forming there while improving conditions in the reheating section due to the increased heat-exchange surface and longer residence time, whereas the percentage of high melting-point, stable crystal forms is not impaired, but even increases. The increased heat-exchange surfaces in the reheating section at decreased capacity extend the residence time not only due to the expanded heat-exchange surface but also because of the decreased mass throughput.

It is of advantage to operate the cooling section with a lot of continuously recirculated coolant, varying the temperature while keeping the amount of coolant constant. The occasional control conventional at the state of the art is abandoned. The large volume of continuously recirculated coolant accelerates the coolant in the cooling section and accordingly improves the conditions for heat exchange by the use of turbulence. This is true both when the machine is being operated at rated capacity and at decreased throughput. When, accordingly, less mass is being put through and the heat-exchange surface in the cooling section is smaller, the temperature of the coolant must be either the same as or slightly higher than that employed when the machine is operated at rated capacity in order to attain the desired preliminary crystallization at the end of the cooling section.

The reheating section is also operated with a lot of continuously recirculated tempering fluid, with both the amount and the temperature of the fluid being kept constant. Since the temperature of the mass entering the reheating section is constant, its temperature as it leaves the reheating section will also be constant, although it can be definitely higher than the temperatures characteristic of the state of the art. Heat exchange is also improved by the turbulent flow at the end of the tempering fluid in the reheating section. The mass itself can be subjected to powerful turbulence by the mixers and stirrers in both the cooling section and the reheating section to eliminate local excess heating and cooling in the mass, promoting the formation of microcrystals and preventing their growth into macrocrystals.

The tempering machine in accordance with the invention has one or more cooling stages at the end of the cooling section that can be withdrawn from the cooling circulation system and added to the tempering circulation system. All of the heat-exchange surfaces will accordingly be exploited to advantage even when the tempering machine is being operate at less than full capacity. The capacity can be reduced in one or more stages, meaning that only a single cooling stage at the transition to the reheating section needs to be converted. This is generally sufficient to reasonably provide an initial range wherein the tempering machine can be operated at 75% to 110% of its rated capacity, whereas it is necessary to convert to the lower mass throughput for an operation at approximately 40% to 75% of rated capacity.

The relative area of the heat-exchange surface in the cooling stage or stages that can be withdrawn from the cooling section can be extensive enough to ensure that the ratio of the surface in the cooling section to that of the surface in the reheating section will be between 3:2 and 1:4 when less mass is being put through. Subsequent to the conversion, that is, the area of the heat-exchange surface in the reheating section will be between 40% and 80% of the area of all the heat-exchange surfaces. Since the heat-exchange surface in the reheating section can accordingly also be definitely more extensive than that in the cooling section and since not only the area but also the volume can be affected, the residence times in the reheating section will be doubled.

It is a particular advantage for all the cooling stages in the cooling section and all the reheating stages in the reheating section to be identical in terms of their heat-exchange surfaces, the volume of their mass-processing compartments, and the design and distribution of their mixers and stirrers. This approach ensures that the cooling stage that converts can be operated as a reheating stage and vice versa with no problem. It will be obvious that the cooling stage or stages that do not convert can be the same size as or a different size from the stages that do convert.

Each cooling stage that converts and each upstream cooling stage at the end that does not convert can have a sensor that detects the temperature of the mass and that can be connected if desired to temperature controls that turn on a magnetic valve where the coolant enters the cooling circulation system. The valve is accordingly not positioned in the cooling circulation system but where the coolant enters it, usually, that is, where the fresh water enters. The sensor indicates the temperature of the mass where it leaves the particular cooling section and hence where it enters the particular reheating section. The temperature of the mass at the transition from the cooling section to the reheating section must be as close as possible to what it would be when operating at rated capacity even when less mass is being put through.

There is a magnetic valve that communicates with the cooling circulation system where the coolant enters each converting cooling stage and a three-to-two way magnetic valve communicating with the tempering-fluid circulation system where the coolant exits each converting cooling stage. Thus the costs of the valves and their associated lines are no higher than absolutely necessary. The magnetic valves and the sensors that detect the temperature of the mass can be jointly controlled with switches to prevent malfunctions.

BRIEF DESCRIPTION OF THE DRAWINGS

Preferred embodiments of the invention will now be described with reference to the drawings, wherein.

DESCRIPTION OF THE PREFERRED EMBODIMENTS

Figure 1:
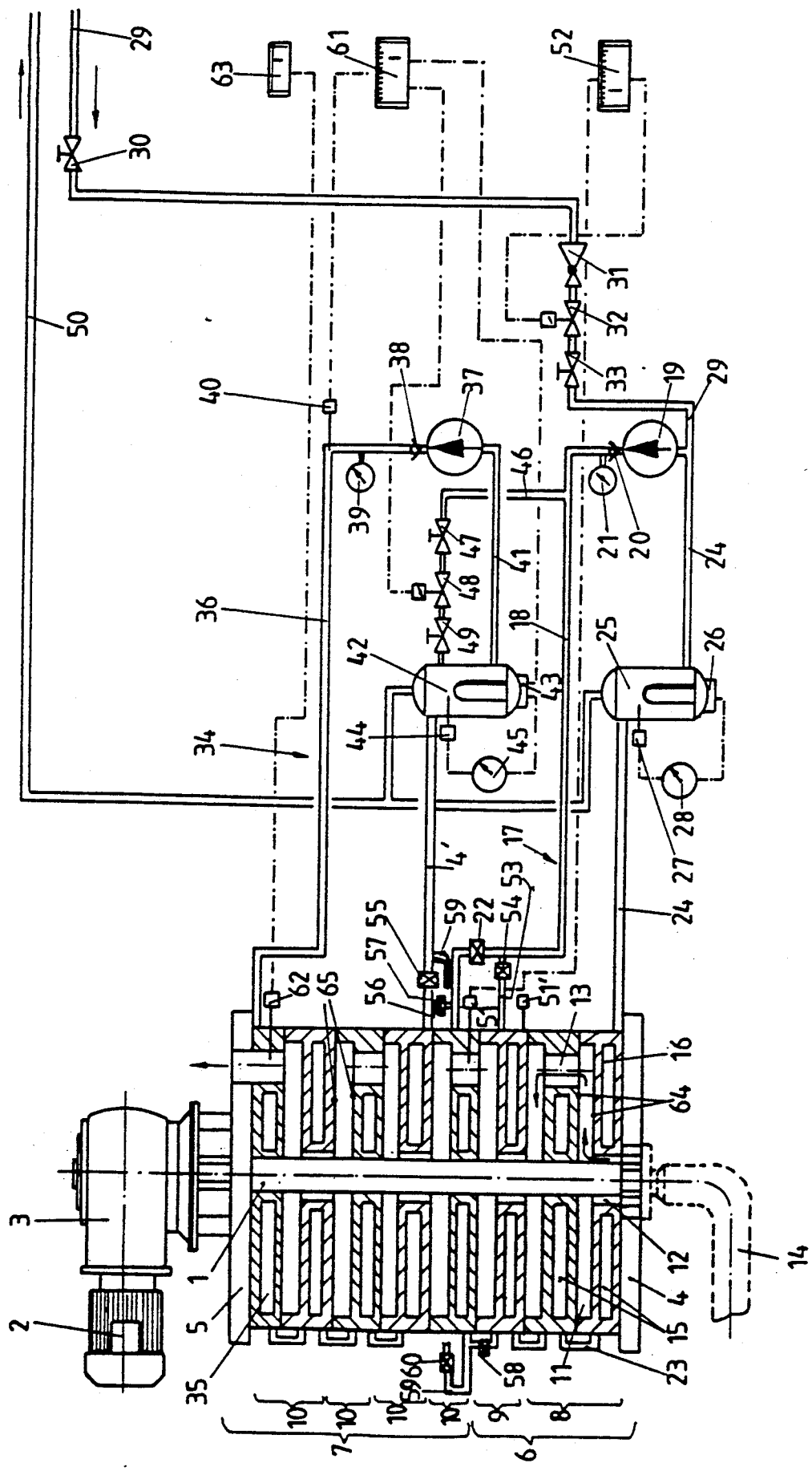
FIG. 1 is a schematic illustration of essential parts of the tempering machine along with its circuitry.

The device illustrated in FIG. 1 has an essentially cylindrical tempering column with a central driveshaft 1 powered by a motor 2 by way of a transmission 3. Between a base plate 4 and a cover plate 5 are several disk-shaped structures that are, with the exception of the uppermost, identical. Some of these structures constitute a cooling section 6. The structures above them constitute a reheating section 7. Cooling section 6 is divided into two cooling stages 8 and 9 that basically consist of identical annular structures, cooling stage 8 consisting of two and cooling stage 9 of only one. Cooling stage 9 accordingly constitutes the end of cooling section 6. It can be associated with reheating section 7 as will be described hereinafter. Cooling stage 8, which begins at the intake into cooling section 6, cannot be converted. Reheating section 7 is composed of several reheating stages 10 and can similarly be divided into essentially or approximately annular disks. The disk-shaped components of cooling stages 8 and 9 and of reheating stages 10 accommodate mass-processing compartments 11 that contain unillustrated mixers and stirrer mounted on driveshaft 1, which rotates them continuously. Two different kinds of disk-shaped structures are stacked alternately, leaving open passages 12 and 13. Passages 12 are radially nearer and passages 13 radially more remote from driveshaft 1. The mass is accordingly forced to travel through every region of mass-processing compartments 11. The mass that is to be tempered travels through a pipe 14, an unillustrated pump at the bottom, and a passage 12 into the first mass-processing compartment 11 in cooling stage 8, whence it arrives in the second mass-processing compartment 11 in cooling stage 8 by way of a passage 13 etc. Cooling stages 8 and 9 also accommodate compartments 15 that are separated from mass-processing compartments 11 and have a coolant 16 derived from a cooling circulation system 17 flowing through them in the opposite direction. Cooling circulation system 17 has a lead-in line 18 that extends from a pump 19 to a compartment 15 in the final converting cooling stage 9. Downstream of pump 19 in lead-in line 18 are a check valve 20, a manometer 21, and a shut-off valve 22. The compartments 15 in adjacent disk-shaped structures communicate by way of lines 23. Accommodated in a return line 24 in cooling circulation system 17 is a mixing vessel 25 wherein the coolant can be heated during the heating phase by a heater 26 subject to a sensor 27 and a contact thermometer 28. Leading into cooling circulation system 17 is a fresh-water line 29 that contains a manual shut-off valve 30, a depressurization valve 31, a magnetic valve 32, and another manual shut-off valve 33.

A tempering circulation system 34 circulates a tempering fluid 35, usually also water, back through the compartments 15 in reheating stages 10. Circulation system 34 also has a lead-in line 36 that extends from a pump 37 to the compartment 15 in uppermost reheating stage 10. Lead-in line 36 contains a check valve 38, a manometer 39, and a sensor 40 that detects the temperature of tempering fluid 35. Tempering fluid 35 flows back through reheating stages 10 and through their compartments 15 by way of communication lines 23. At the beginning of the first reheating stage 10 in reheating section 7 is a return line 41 that leads back to pump 37 and contains a mixing vessel 42. The vessel is provided with a heater 43 controlled by a sensor 44 and a contact thermometer 45. Leading from the line 18 into cooling circulation system 17 to the mixing vessel 42 in circulation system 34 is a connecting line 46 that has flow-control valve 47, a magnetic valve 48, and a manual shut-off valve 49. Both mixing vessel 25 and mixing vessel 42 have an overflow line 50.

In a passage 13 at the end of converting cooling stage 9 is a sensor 51 that detects the temperature of the mass at that point and communicates by way of an electric line with temperature controls 52 that regulate the magnetic valve 32 in fresh-water line 29, making it possible to decrease the temperature of the coolant 16 in cooling circulation system 17 by adding fresh water. Heater 26 can increase the temperature. The amount of coolant 16 recirculated in cooling circulation system 17 and hence its rate in the compartments 15 in cooling stages 8 and 9 are constant. There is another sensor 51' at the end of non-converting cooling stage 8 that extends into passage 12 at the illustrated point and detects the temperature of the mass when necessary. Sensors 51 and 51' can be alternately connected to temperature controls 52 depending on whether the tempering machine is being operated at full capacity with converting cooling stage 9 associated with cooling section 6 or at decreased capacity and mass throughput with cooling stage 9 functioning as the first reheating stage reheating stage 10 in reheating section 7. A lead-in line section 53 accordingly also extends, accommodating a manual shut-off valve 54, from lead-in line 18 to the final compartment 15 in cooling stage 8. Coolant 16 can be forwarded either to cooling stage 9 or to cooling stage 8 by opening and closing shut-off valves 22 and 54. The return line 41 in circulation system 34 contains a manual shut-off valve 55. A bridging line 56 that connects return line 41 to lead-in line 18 contains another manual shut-off valve 57. Valves 55 and 57 can be alternately opened and closed to divert tempering fluid 35 either from first reheating stage 10 and back to mixing vessel 42 by way of return line 41 or into converted cooling stage 9. The communication line 23 in converting cooling stage 9 contains another manual shut-off valve 58 and a return line 59 contains still another manual shut-off valve 60. Valves 58 and 60 can be alternately opened and closed to divert the coolant from cooling stage 9 to cooling stage 8 or to supply tempering fluid to the return line 41 in circulation system 34.

The sensor 40 in the lead-in line 36 in circulation system 34 is connected to temperature controls 61 that act on the magnetic valve 48 in connecting line 46, making it possible to regulate the temperature of the tempering fluid 35 in lead-in line 36. This generally occurs in conjunction with reducing the temperature of the tempering fluid because the temperature of the coolant during the tempering process than the temperature of the tempering fluid. The temperature can be increased by the heater 43 in mixing vessel 42. A sensor 62 operates in conjunction with an indicator 63 that displays the temperature of the mass leaving reheating section 7, which is the operating temperature that the mass exhibits after being tempered.

It will accordingly be apparent that, when the tempering machine operates at 75% to 110% of its rated capacity, cooling section 6 will comprise cooling stages 8 and 9 and reheating section 7 will consist of reheating stages 10.

When on the other hand the machine is operated at a lower capacity and an accordingly smaller mass throughput, at 40% to 75% of its rated capacity, that is, cooling stage 9 will be converted into the first reheating stage 10 in reheating section 7. This procedure will reduce the heat-exchange surfaces 64 in cooling section 6 and expand the heat-exchange surfaces 65 in reheating section 7. The same is approximately valid for the enclosed volume and for the residence time of the mass in cooling section 6. The volume and residence time are in any case increased in reheating section 7.

How final cooling stages are disassociated from the cooling section and associated with the reheating section will now be explained with reference to further examples.

Figure 2:
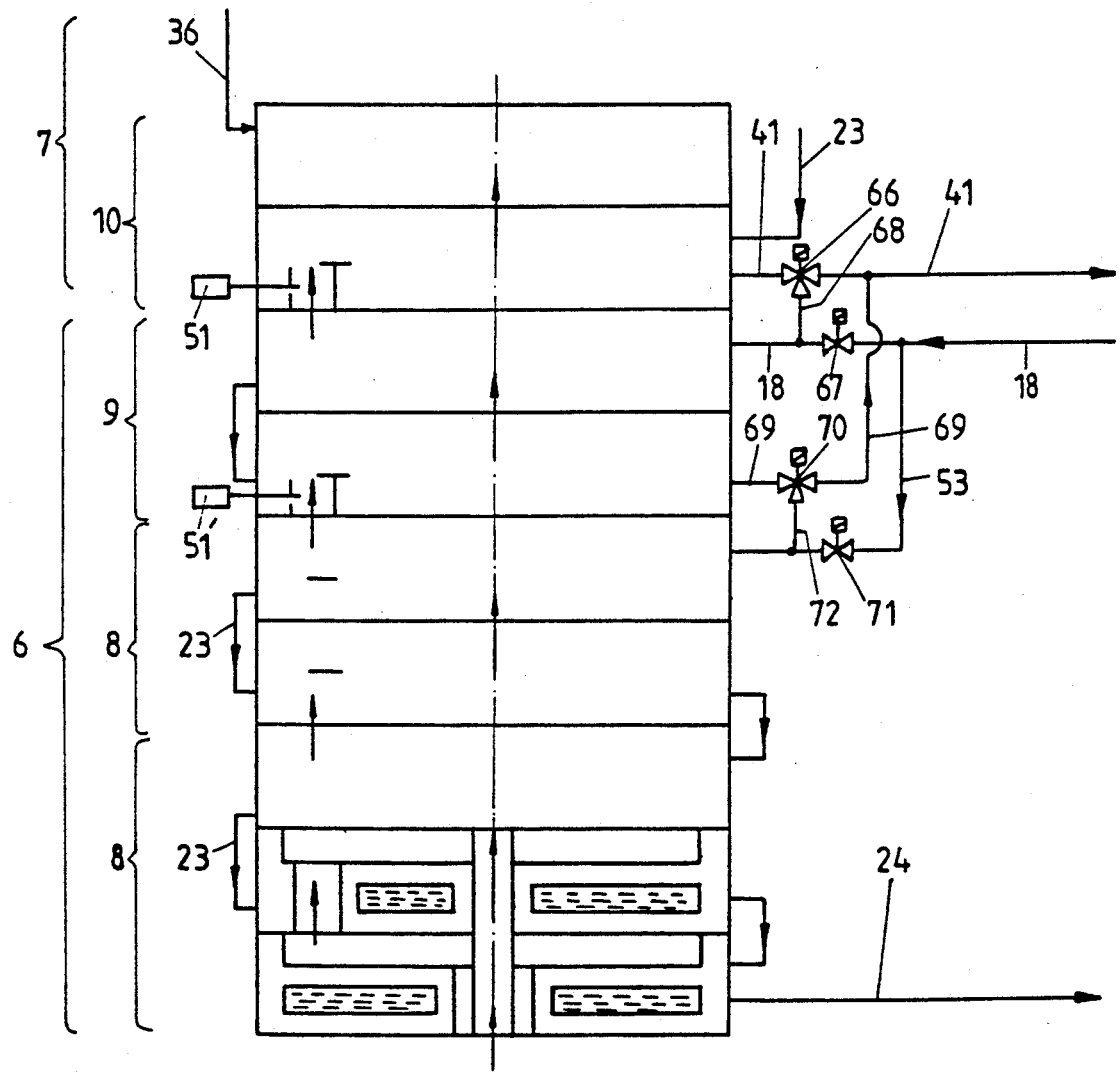
FIG. 2 is a schematic illustration of a cooling section with a converting cooling stage.

FIG. 2 schematically represents the bottom of a tempering column with a cooling section 6 that has two non-converting cooling stages 8 and 8' and one converting cooling stage 9. The first reheating stage 10 in reheating section 7 is also illustrated for the sake of completeness. The tempering circulation system is connected by way of its lead-in line 36 to reheating section 7, and the tempering fluid flows back through communication lines 23 to first reheating stage 10 and by way of return line 41 to the unillustrated mixing vessel 42. Return line 41 contains a three-to-two way valve 66 in the form of a magnetic valve. The lead-in line 18 in cooling circulation system 17 is connected at the end to the appropriate compartment 15 in converting cooling stage 9. Lead-in line 18 also contains a magnetic shut-off valve 67. A communication line 68 leads from the third connection of three-to-two way valve 66 to lead-in line 18 upstream of magnetic shut-off valve 67. A return-line section 69 extends in exactly the same way from the compartment 15 in non-converting cooling stage 8' to return line 41. Line 41 contains another three-to-two way magnetic valve 70. A lead-in line section 53 in cooling circulation system 17 leads from lead-in line 18 to cooling stage 8'. This line contains a magnetic shut-off valve 71. A communicating line 72 extends from the third connection of three-to-two way valve 70 to lead-in line section 53. Sensor 51 is positioned at the transition from cooling stage 9 to the beginning of reheating stage 10. Sensor 51' is positioned at the transition from cooling stage 8' to cooling stage 9.

Sensor 51 is in operation and sensor 51' out of operation while the tempering machine is being operated at normal rated capacity. The various sections of return line 41 communicate through three-to-two way valve 66 and communication line 68 is blocked. Magnetic shut-off valve 67 is open. Three-to-two way valve 70 provides access to communicating line 72, and magnetic shut-off valve 71 is closed. This range of lines accordingly operates like a communication line 23. The tempering fluid from first reheating stage 10 flows back through return line 41. The coolant in cooling circulation system 17 is supplied to cooling stage 9 by way of lead-in line 18, flows back through cooling stages 9, 8', and 8 by way of communication lines 23 or by way of part of return-line section 69, by way of three-to-two way valve 70, communicating line 72, and part of lead-in line section 53.

When the tempering machine is operated at a lower capacity, sensor 51' will act on temperature controls 52 and the valves will operate as follows. Magnetic shut-off valve 67 is closed and magnetic shut-off valve 71 opened, allowing coolant to flow by way of the resulting path no longer to cooling stage 9 but to cooling stage 8' and thence back from cooling stage 8 by way of return line 24. Three-to-two way valve 66 assumes a state wherein the tempering fluid is diverted from reheating stage 10 to the converted cooling stage 9, which is now functioning in the capacity of an additional reheating stage. This occurs by way of communication line 68. Three-to-two way valve 70 on the other hand is positioned for straight-line flow, and communicating line 72 is blocked. The tempering fluid now flows through return-line section 69 and the communicating section of return line 41.

Figure 3:
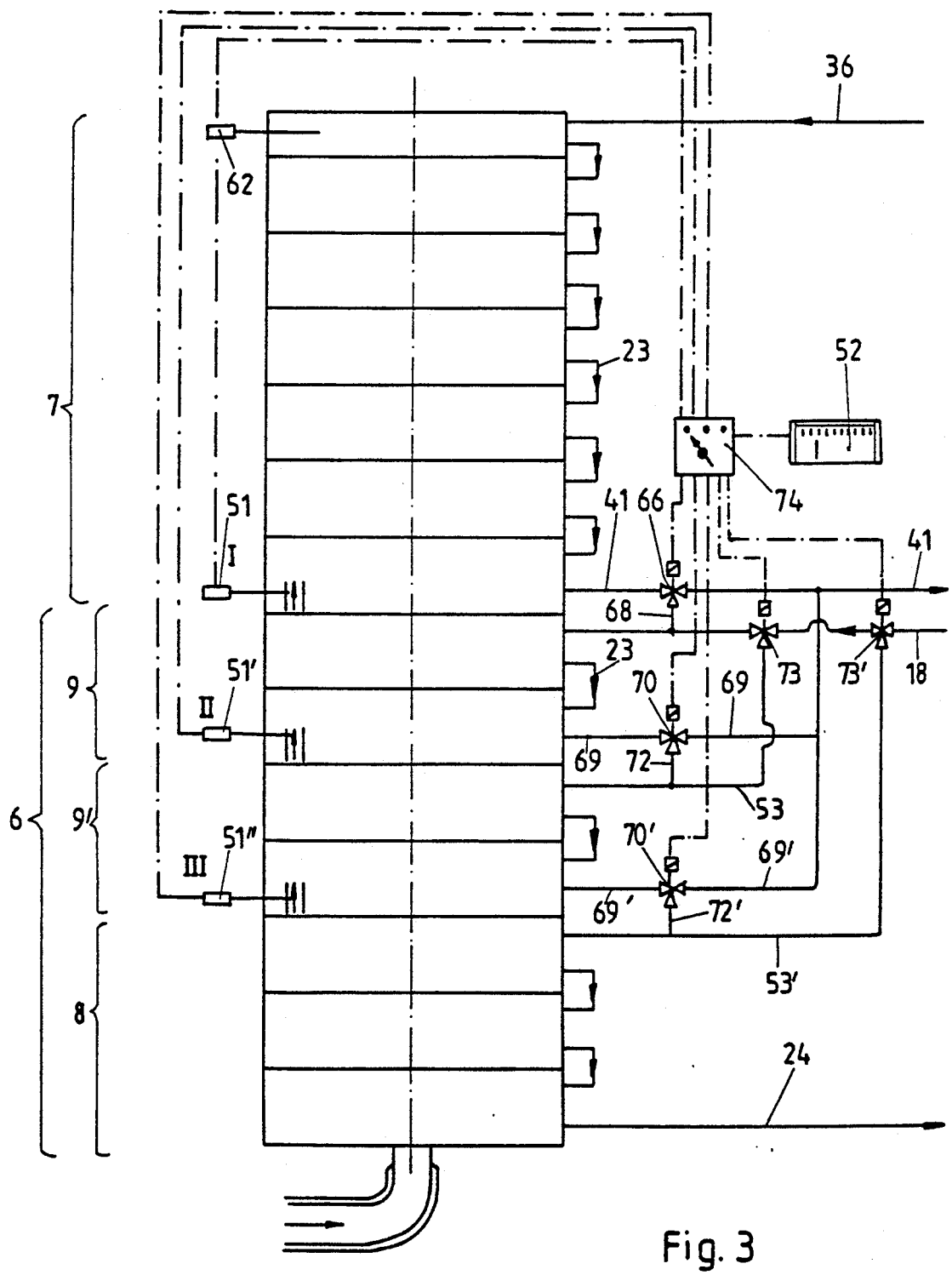
FIG. 3 is a schematic illustration of a tempering column with a cooling section that has two converting cooling stages.

The embodiment illustrated in FIG. 3 represents another possible solution with two converting cooling stages 9 and 9'. Either stage 9 alone or both stages 9 and 9' can be converted from cooling section 6 to reheating section 7. Three sensors 51, 51', and 51" are accordingly needed. The lines that communicate with return line 41 contain three-to-two way valves 66, 70, and 70' in the form of magnetic valves. One three-to-two way magnetic valve 73 is associated with cooling stage 9 and another three-to-two way valve 73' with cooling stage 9'. Three output stages can be engaged as desired by way of a power switch 74—one range with the tempering machine being operated at 80% to 110% of rated capacity, another at 50% to 80% of rated capacity, and a third at 30% to 50% of rated capacity, and a only connect sensors 51, 51', and 51" to temperature controls 52 but also convert three-to-two way valves 66, 70, 70', 73, normal rated capacity, three-to-two way valves 66, 73, and 73' are set for straight flow and three-to-two way valves 70 and 70' are set for diversion, with both cooling stages 9 and 9' associated with cooling section 6.

When cooling stage 9 is to be operated in the capacity of a reheating stage and cooling stage 9' remains in cooling section 6, power switch 74 is triggered to connect sensor 51' instead of sensor 51 to temperature controls 52. Three-to-two way valves 66, 70', and 73 simultaneously change to diverted and three-to-two way valves 70 and 73' to straight flow. The tempering fluid will now flow back by way of return-line section 69 and return line 41, whereas the coolant will flow from lead-in line 18 to cooling stage 9' by way of three-to-two way valves 73 and 73' and of lead-in line section 53, and back by way of return line 24.

When the throughput of mass is even lower, cooling stages 9 and 9' are both added to reheating stage 10. Power switch 74 is tripped to switch sensor 51" to temperature controls 52. Three-to-two way valves 66, 70, and 73' simultaneous switch over to diverted flow and three-to-two way valve 70' to straight flow. The corresponding operational connections will, as is evident, occur.

I claim:

1. A method for preparing continuously masses containing cocoa butter or other fats including masses of chocolate, for further processing, comprising the steps: providing a tempering machine with a cooling section having a plurality of cooling stages and a reheating section having a plurality of reheating stages; transporting said masses through said cooling section to be cooled and through said reheating section to be reheated; varying the number of cooling stages and the number of reheating stages dependent on the amount of masses being transported through said cooling section and said reheating section so that when a reduced amount of masses is transported the number of cooling stages is reduced and the number of reheating stages is correspondingly increased.

2. A method as defined in claim 1, wherein a ratio of heat exchanger surfaces in said cooling section to heat exchanger surfaces in said reheating section is attained between 3:2 and 1:4 by reducing a sufficient number of cooling stages of said cooling section and increasing said reheating stages correspondingly by the same said sufficient number.

3. A method as defined in claim 1, including the step of recirculating continuously a constant amount of coolant in said cooling section while temperature varies.

4. A method as defined in claim 1, including the step of recirculating a constant amount of tempering fluid continuously in said reheating section while maintaining temperature of said tempering fluid constant.

5. A method for preparing continuously masses containing cocoa butter or other fats including masses of chocolate, for further processing, comprising the steps: providing a tempering machine with a cooling section having a plurality of cooling stages and a reheating section having a plurality of reheating stages; transporting said masses through said cooling section to be cooled and through said reheating section to be reheated; varying the number of cooling stages and the number of reheating stages dependent on the amount of masses being transported through said cooling section and said reheating section so that when a reduced amount of masses is transported the number of cooling stages is reduced and the number of reheating stages is correspondingly increased; obtaining a ratio of heat exchanger surfaces in said cooling section to heat exchanger surfaces in said reheating section between 3:2 and 1:4 by reducing a sufficient number of cooling stages of said cooling section and increasing said reheating stages correspondingly by the same said sufficient number; and recirculating a constant amount of coolant continuously in said cooling section while temperature varies.

* * * * *